(12) United States Patent
Aharon et al.

(10) Patent No.: US 7,088,358 B2
(45) Date of Patent: Aug. 8, 2006

(54) COLLISION DETECTION METHOD FOR DEFORMABLE OBJECTS IN A SCENE

(75) Inventors: Shmuel Aharon, West Windsor, NJ (US); Christophe Lenglet, Chauny (FR)

(73) Assignee: Siemens Corporate Research, Inc., Princeton, NJ (US)

( * ) Notice: Subject to any disclaimer, the term of this patent is extended or adjusted under 35 U.S.C. 154(b) by 371 days.

(21) Appl. No.: 10/370,382

(22) Filed: Feb. 19, 2003

(65) Prior Publication Data

US 2003/0164864 A1 Sep. 4, 2003

(51) Int. Cl.
*G06T 15/00* (2006.01)
*G09G 5/00* (2006.01)

(52) U.S. Cl. ...................... 345/419; 345/622
(58) Field of Classification Search .............. 345/622, 345/419
See application file for complete search history.

(56) References Cited

U.S. PATENT DOCUMENTS

| | | | | |
|---|---|---|---|---|
| 5,990,896 A * | 11/1999 | Barrus | ...................... | 345/420 |
| 6,023,279 A * | 2/2000 | Sowizral et al. | ............ | 345/421 |
| 6,067,096 A * | 5/2000 | Nagle | .......................... | 345/473 |
| 6,342,886 B1 * | 1/2002 | Pfister et al. | ............... | 345/424 |
| 6,500,008 B1 * | 12/2002 | Ebersole et al. | ............. | 434/226 |
| 6,570,564 B1 * | 5/2003 | Sowizral et al. | ............. | 345/420 |
| 6,731,304 B1 * | 5/2004 | Sowizral et al. | ............ | 345/622 |
| 6,734,852 B1 * | 5/2004 | Sowizral et al. | ............ | 345/420 |
| 6,734,853 B1 * | 5/2004 | Heim et al. | ................. | 345/421 |
| 6,747,651 B1 * | 6/2004 | Tan et al. | .................... | 345/474 |
| 6,862,026 B1 * | 3/2005 | Zachmann | ................... | 345/474 |

OTHER PUBLICATIONS

He, "Fast collision detection using QuOSPO trees" Proceedings of the 1999 Symposium on Interactive 3D Graphics (Atlanta, Georgia, United States, Apr. 26-29, 1999), SI3D '99. ACM Press, New York, NY, 55-62.*

Gino Van Den Bergen: "Efficient Collision Detection of Complex Deformable Models using AABB Trees" Journal of Graphics Tools, Online! vol. 2, No. 4. Nov. 6, 1998, pp. 1-14, XP002241613 Retrieved form the Internet:,URL:www.win.tue.nl/{gino/solid/jgt98deform. Pdf>'retrieved on May 15, 2003! title Abstract p. 2, line 5-line 9 p. 2, line 15-line 16 p. 3, line 9-line 20 p. 4, line 15-p. 5, line 1 p. 7, line 23-line 29.

(Continued)

*Primary Examiner*—Ulka Chauhan
*Assistant Examiner*—Roberta Prendergast
(74) *Attorney, Agent, or Firm*—Donald B. Paschburg; F. Chau & Associates, LL

(57) ABSTRACT

A collision detection method for polygonal objects using OpenGL is provided, comprising dividing a surface of each object into a set of axis aligned bounding boxes (AABB) to build an AABB tree, selecting an object among the plurality of polygonal objects as a reference object, defining a global bounding box of the reference object, detecting first bounding boxes of the plurality of polygonal objects that intersect the global bounding box of the reference object, and determining intersections for each polygon of the reference object with all polygons of the plurality of polygonal objects.

24 Claims, 5 Drawing Sheets

OTHER PUBLICATIONS

Lombardo J-C et al: "Real-time collision detection for virtual surgery" Computer Animation 1999. Proceedings Geneva, Seitzerland May 26-29, 1999, Los Alamitos, CA USA, IEEE Comput. Soc, US, May 26, 1999, pp. 82-90, XP010343898 ISBN: 0-7695-0167-2 abstract section"1.2. Collision detection techniques" section 2. Collision detection with the graphics hardware section "2.1. Viewing volumes" section "2.2. Picking" section "3. Static Collision Detection" figure 2.

* cited by examiner

COLLISION DETECTION METHOD FOR DEFORMABLE OBJECTS IN A SCENE

BACKGROUND

1. Field of the Invention

The present invention relates to a collision detection method for objects in a scene and, more particularly, to a collision detection method for polygonal deformable objects using OpenGL.

2. Discussion of Related Art

Under many interactive virtual environments, such as surgery simulations, there is a need to determine if two or more objects in a scene are colliding with each other. In general, collision between objects may be detected if there are surfaces of the objects that are touching and/or intersecting with each other. For realistic interactions or simulations in virtual environments, collision detection and calculations require good timing performance and accuracy.

The most general and versatile methods to detect collisions between polygonal models are based on bounding volume hierarchies. Hierarchies of bounding volumes provide a fast way to perform collision detection between complex models. These methods are primarily categorized by the type of bounding volume that is used at each node of a hierarchy tree. These methods include Object Oriented Bounding Boxes (OOBB), axis aligned bounding boxes (AABB), or bounding spheres. The OOBB method, used by a Robust and Accurate Polygon Interference Detection (RAPID) system, is very efficient in the collision query.

In the OOBB method, the collision detection is performed by testing if bounding boxes from different objects overlap. However, it is necessary to rebuild the hierarchy tree or refit it at every step when deformable objects are concerned. This is a time consuming task that makes this method not suitable for use with deformable objects.

The AABB method is also a fast method for collision query, which can be updated for object's deformation. In AABB trees, the boxes are aligned to the axes of the model's local coordinate system and, thus, all the boxes in a tree have the same orientation. An AABB tree is constructed top-down, by recursive subdivision. At each recursion step, the smallest AABB of the set of primitives is computed, and the set is split by ordering the primitives with respect to a well-chosen partitioning plane. This process continues until each subset contains one element (i.e. primitive). Thus, an AABB tree is made with a set of n leaves and n−1 internal nodes. However, updating its tree structure is still the bottleneck for this method. The cost of the tree update increases significantly with the number of polygons using the conventional AABB method.

The main limitation of the above methods is that in the case of deformable objects the hierarchy trees have to be updated (or re-built) at every step of the simulation. This is a time-consuming step that significantly reduces the efficiency of these methods.

One approach to reduce the time consuming step is to use graphics hardware acceleration for collision detection. However, this approach is limited to collisions between two-dimensional objects, or to some specialized three-dimensional scenes, such as those whose objects collide only in a two-dimensional plane.

Another well-known approach is to use the selection mode of the OpenGL system to identify collisions between polygonal surfaces. However, it is also limited to collisions between a deformable polygonal surface and an object with a very simple shape, such as a cylinder or a box. Furthermore, efficiency of the performance according to this method significantly decreases with the increase of the object's number of polygons. Therefore, it is limited to objects with relatively small number of polygons.

A need, therefore, exists for a collision detection method using the OpenGL system which allows a fast and accurate way to detect the collisions between the individual polygons of deformable objects.

SUMMARY OF THE INVENTION

The present invention is directed to a collision detection method for a plurality of polygonal deformable objects in a scene using the OpenGL graphics library specification. This method can also be used for non-deformable objects. According to an embodiment of the present invention, the method comprises building an AABB tree by dividing a surface of each object into a set of axis aligned bounding boxes (AABB); selecting an object among the plurality of polygonal objects as a reference object; defining a global bounding box of the reference object; and detecting first bounding boxes of the plurality of polygonal objects that intersect the global bounding box of the reference object. The method includes rendering the scene in selection mode of the OpenGL graphics library specification using an orthographic camera.

In this embodiment, the step of building a tree comprises separating the axis aligned bounding boxes, thereby each containing a predetermined number of polygons, determining whether each of the polygons corresponds to a separate bounding box, and eliminating bounding boxes that does not contain any polygon. The rendering of the scene in the selection mode is performed by naming each object in the scene.

According to an embodiment of the invention, the collision detection method detects second bounding boxes of the reference object that intersect with detected first bounding boxes of the plurality of polygonal objects. Then, the method generates a list of polygons of the reference object that have potential collision with an object or objects in the scene as well as a list of polygons of the plurality of polygonal objects that intersect with detected second bounding boxes of the reference object.

Then, the method determines intersections for each detected polygon of the reference object with all detected polygons of the plurality of polygonal objects. When dealing with deformable objects, the method updates the bounding boxes of the reference object and the bounding boxes of the plurality of polygonal deformable objects.

BRIEF DESCRIPTION OF THE DRAWINGS

A more complete appreciation of the invention, and many of the attendant advantages thereof, will be readily apparent with reference to the following detailed description when considered in conjunction with the accompanying drawings, wherein.

DETAILED DESCRIPTION OF PREFERRED EMBODIMENTS

The present invention will be described in more detail with reference to the accompanying drawings in which preferred embodiments of the invention are shown.

A collision detection method according to an embodiment of the present invention is provided to detect collisions between a specified object, a reference object, and all other objects in a scene. It is assumed that each object is built with a set of polygons, which are either triangles or quadrangles.

It is to be understood that the systems and methods described herein in accordance with the present invention may be implemented in various forms of hardware, software, firmware, special purpose processors, or a combination thereof. Preferably, the present invention is implemented in software as an application comprising program instructions that are tangibly embodied on one or more program storage devices (e.g., magnetic floppy disk, RAM, CD Rom, ROM and flash memory), and executable by any device or machine comprising suitable architecture.

It is to be further understood that since the constituent system modules and method steps depicted in the accompanying Figures are preferably implemented in software, the actual connection between the system components (or the flow of the process steps) may differ depending upon the manner in which the present invention is programmed. Given the teachings herein, one of ordinary skill in the related art will be able to contemplate these and similar implementations or configurations of the present invention.

Figure 1:
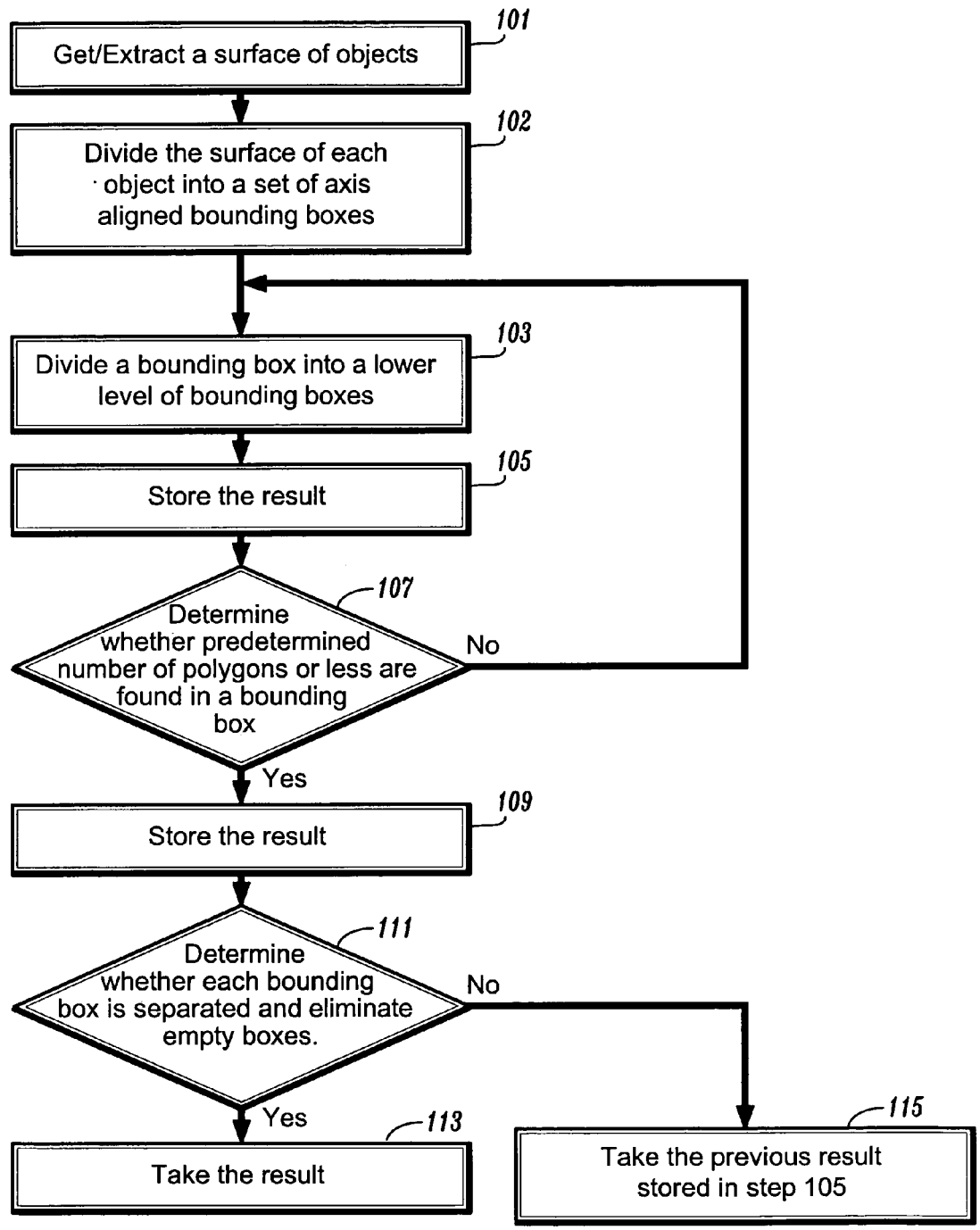
FIG. 1 is a flow chart of a method for building an axis aligned boxes (AABB) tree according to an embodiment of the present invention.

Referring now to FIG. 1, a flow chart is shown for explaining a method of building an axis aligned bounding boxes (AABB) tree. According to this embodiment, a surface of each object in a scene is divided into a set of axis aligned bounding boxes according to an embodiment of the present invention.

A surface of each object of a scene given in step 101 is divided into a set of Axis Aligned Bounding Boxes (step 102). Then, each of bounding boxes is divided into a lower level bounding box (step 103) and stored in a memory (step 105). The dividing step is performed until each bounding box in the scene contains no more than a predetermined number of polygons (step 107). If the divided bounding box has the predetermined number of polygons, the method proceeds to store that result in the memory (step 109). If the divided bounding box has more than the predetermined polygons, the method returns to the dividing step (step 103) to subdivide the divided bounding box.

Then, it is determined whether the divided or a subdivide box is separated such that each polygon belongs to one and only one bounding box, and bounding boxes that contained no polygons are eliminated (step 111). If separated as suggested above, separated bounding boxes are taken to stop the dividing process (step 113). If not separated, the method takes a previous result that was stored in step 105 (step 115) as a separated bounding box.

According to the above embodiment of the invention, only roots and leaves of the AABB tree are used, and internal nodes are ignored. Here, the root is defined as a global bounding box and the leaves as separated bounding boxes. This allows a user to perform very fast updates since there is no need to consider the complete tree structure. This is because a bounding box is subdivided only until the number of polygons contained in a bounding box is below a specified threshold, resulting in separated bounding boxes.

A collision detection method according to a preferred embodiment of the present invention is based on rendering the scene in a selection mode of the OpenGL graphics system (hereinafter refer to as "OpenGL"), and using an orthographic camera. OpenGL is a low-level graphics library specification, which makes available to the user a small set of geometric primitives such as points, lines, polygons, images, and bitmaps. OpenGL provides a set of commands that allow the specification of geometric objects in two or three dimensions and the selection mode is one of those commands.

OpenGL has a selection mode that is typically operated for selecting interested objects in the scene. The selection mode automatically tells which objects in the scene are drawn inside a specified region, called the OpenGL viewing volume. Before rendering objects in the selection mode of OpenGL, a "name" is provided for each object or primitive in the scene. After rendering in selection mode, OpenGL returns the list of all 'names' of the objects or primitives found inside the viewing volume.

According to an embodiment of the present invention, the OpenGL viewing volume is defined as a small region tightly covering a given polygon. Then, the rendering of all other polygons of interest in selection mode is performed to find out if they are drawn inside the specified polygon viewing volume, which means that they are intersecting with the given polygon. The accuracy of this detection method is a function of the viewing volume definition, and how well this viewing volume describes the region that this polygon occupies.

Figure 2:
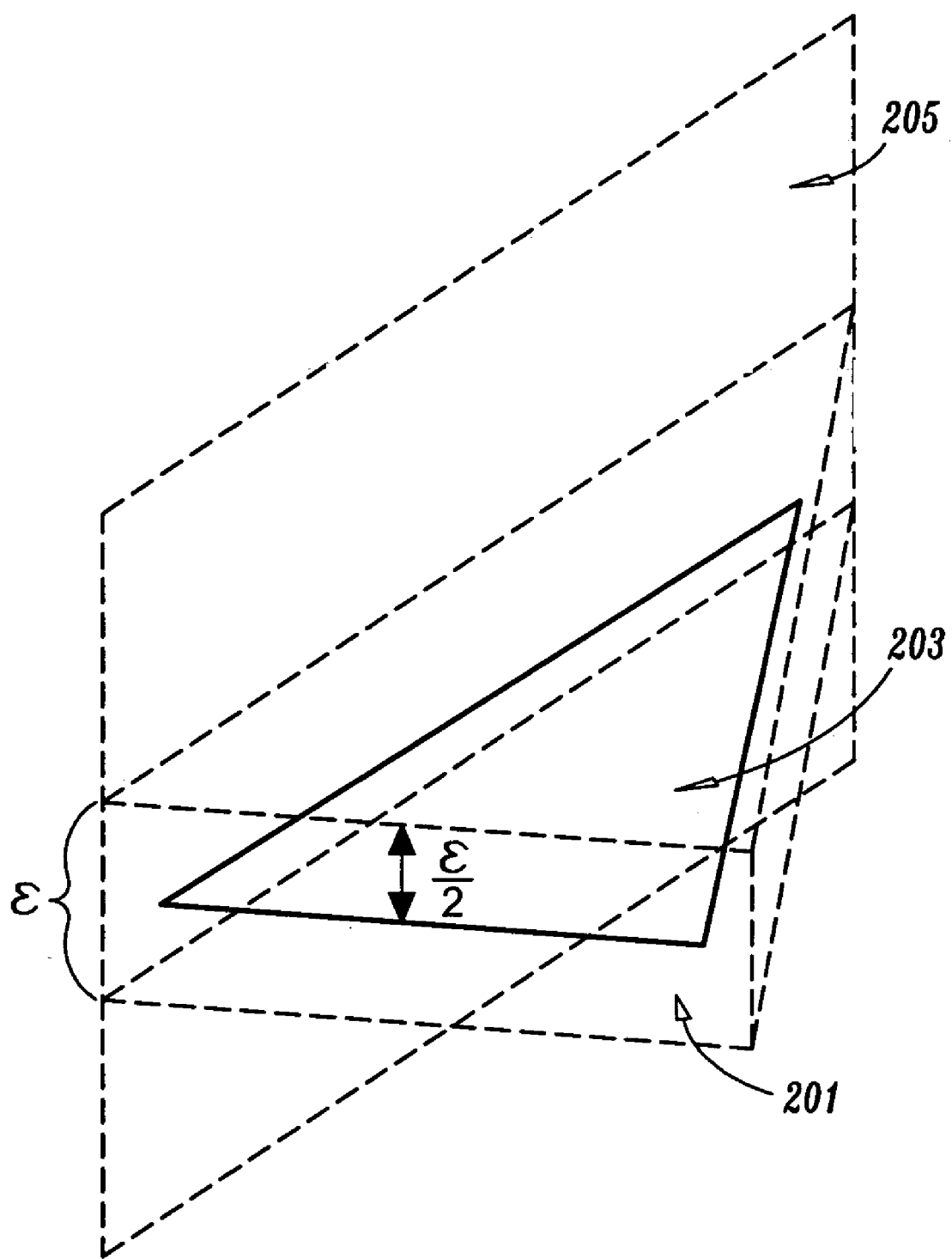
FIG. 2 is a geometric diagram for defining a viewing volume fitting a triangular polygon on a surface of an object.

FIG. 2 is a geometric diagram for defining a viewing volume fitting a triangular polygon on a surface of an object.

As shown in FIG. 2, if a polygon under consideration is a triangular polygon 203, two clipping planes (for clarity only one clipping plane 205 is shown) can be used to limit the viewing volume to a pyramid, tightly fitted around the polygon.

A first step of defining the viewing volume is to find the polygon's two-dimensional bounding box 201 that resides in its plane, then specifying the viewing volume around this bounding box 201. Typically, this process is done by defining the left, right, bottom, and top planes of the viewing volume as the four edges of this bounding box. The next step is to define the depth of the viewing volume to be a very small number, $\epsilon$ (typically $\epsilon=0.001$), which specifies the required accuracy. The near and far planes are set to be $$\frac{-\varepsilon}{2} \text{ and } \frac{\varepsilon}{2}.$$

This defining process can be easily adapted for quadrangular polygons. In this case, three clipping planes might be needed to limit the viewing volume to the quadrangle edges. Then, the OpenGL viewing volume is a rectangular parallelepiped (or more informally, a box), defined by 6 values representing 6 planes named left, right, bottom, top, near and far.

Figure 3:
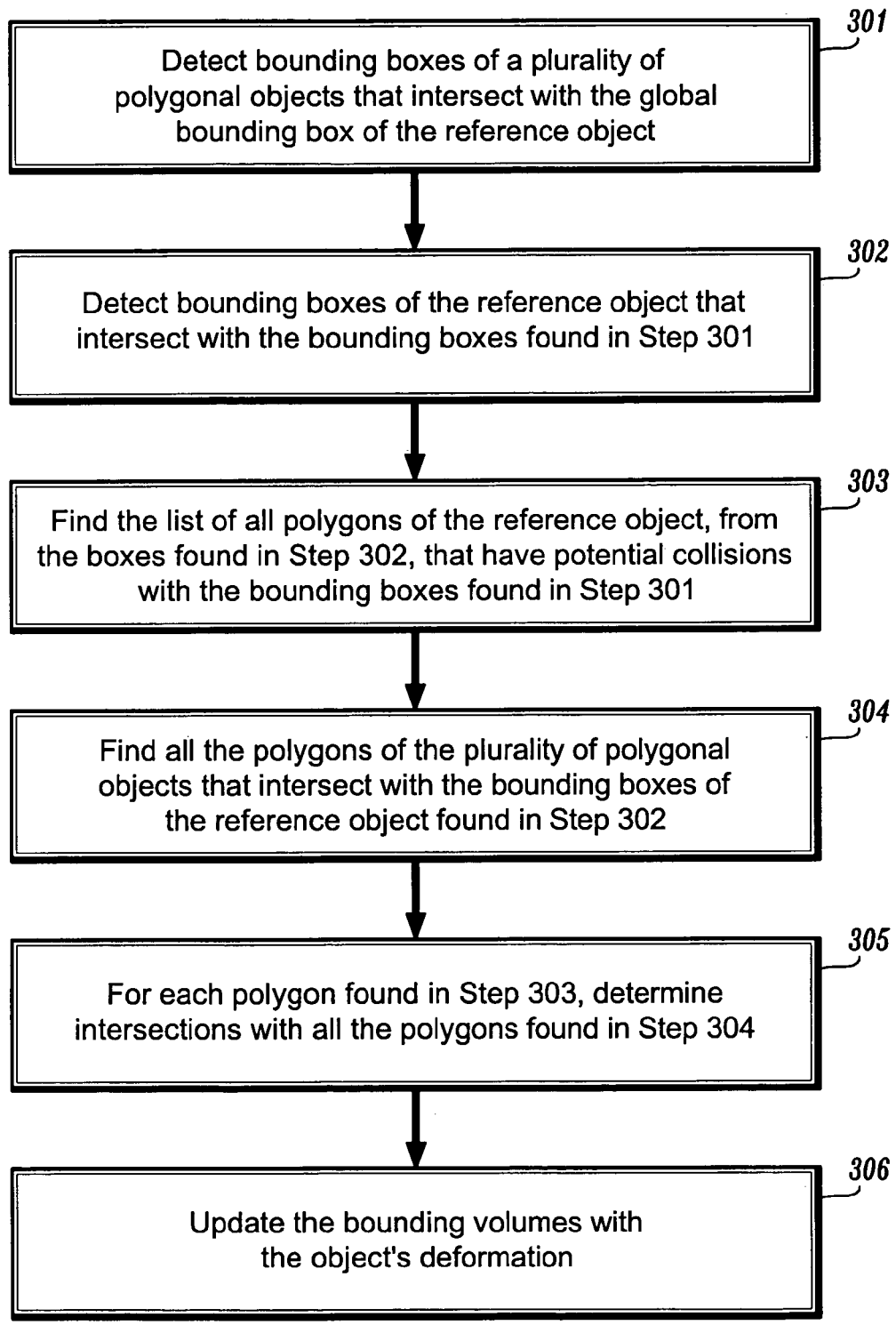
FIG. 3 is a flow chart illustrating a process for detecting collision of objects in a scene when dealing with polygonal deformable objects according to an embodiment of the present invention.

FIG. 3 is a flow chart illustrating an overall process for detecting collision of objects in a scene when dealing with polygonal deformable objects according to an embodiment of the present invention.

The first step 301 is to find bounding boxes of a plurality of polygonal objects that intersect with a global bounding box of a reference object. First, the reference object can be predetermined among the objects to be tested. The step 301 is done by defining the global bounding box of the reference object as an OpenGL viewing volume, and rendering all the bounding boxes of all other objects each defined as a triangular polygonal strip, in selection mode, using a different "name" for each one. Here, triangular polygonal strips are preferably used because they are the most optimized OpenGL primitive.

Collisions can occur only in the area of the bounding boxes that intersect with the global bounding box of the reference object. Therefore, only these interesting bounding boxes will be processed in the next step. If there is no bounding box that intersects the global bounding box of the reference object, then there is no collision and the process stops.

In step 302, other bounding boxes of the reference object are found that intersect with the bounding boxes found in the previous step 301. As in step 301, this step is done by defining the OpenGL viewing volume as one of the bounding boxes found in the previous step 301, and rendering all the bounding boxes of the reference object defined as triangular polygonal strips in selection mode, using a different "name" for each one. This process is repeated using all of the bounding boxes that have been found in the previous step 301. For each bounding box from an object that is potentially involved in a collision, the step 302 provides the list of all bounding boxes from the reference object that intersect with each bounding box of the other objects, if any.

Next, the method is to find the list of all the reference object's polygons that have potential collisions with any other objects in the scene (step 303). For a bounding box of a given object found in step 301, rendering in selection mode is performed for all the polygons contained in all the bounding boxes from the reference object, which are found in step 302 to intersect the bounding box of the given object found in step 301. This results in a major computational saving since it can greatly reduce the final number of polygon-polygon intersection checks. To minimize the number of viewing volume definitions, this step can be combined with step 302. Through the step 303, $L_r^i$ can be obtained where $L_r^i$ is a list of potentially colliding polygons inside a specific bounding box (i) of the reference object (r). Here, i goes from 1 to the number of bounding boxes of the reference object (r).

In step 304, all the polygons from all other objects in the scene that intersect with the bounding boxes of the reference object are found. These polygons have potential collisions with the reference object. As was done in step 303, the OpenGL viewing volume is defined as one of the reference object bounding boxes found in step 302 to detect intersections with one or more of the objects' bounding boxes found in step 301. Then, the rendering in selection mode is performed for all the polygons from the objects' bounding boxes that were found to intersect with this reference object bounding box, using a different "name" for each polygon. This procedure is repeated for all the reference object bounding boxes found in step 302. Through the step 304, $$L_{ri}^{jk}$$

can be obtained where $$L_{ri}^{jk}$$

is a list of the polygons potentially colliding with polygons of $L_r^i$ inside the bounding boxes (k) from object (j) of the scene. Here, j goes from 1 to the number of objects in the scene (excluding the reference object), and k goes from 1 to the number of bounding boxes for object j. This significantly limits the number of polygons to be, checked if they have collisions, thereby reducing the number of polygon-polygon intersection tests.

In step 305, the polygons of the reference object are found that are colliding with polygons from an object, or objects, and the list of these polygons can be obtained. For every polygon P in the $L_r^i$ list with i going from 1 to the number of reference object bounding boxes, it is found whether or not this polygon really intersects the polygons from the $$L_{ri}^{jk}$$

lists.

To execute the step 305, as shown in steps 302 through 304, the polygon's viewing volume is defined as a tightly fitting volume around the polygon P as described above. Then, the rendering in selection mode of all the polygons in a $$L_{ri}^{jk}$$

list is performed, giving a different name to each of them. Every polygon that is found inside the specified polygon's viewing volume is actually intersecting the given polygon, P. Therefore, the accuracy of this detection step is substantially relying on the polygon's viewing volume limiting the region that this polygon occupies. This step is repeated for all non-empty $$L_{ri}^{jk}$$

lists, and for all the $L_r^i$ lists, resulting in the list of all the polygons from the reference object and the polygons from the scene's object(s) that intersect.

When dealing with deformable objects, it is necessary to update the Axis Aligned Bounding Boxes (AABB) tree after every step of the simulation (step 306). As mentioned above, only the root of the AABB tree (the global bounding box of an object), and its leaves are subject to updating the tree. Due to the relatively small number of bounding boxes that need to be updated, this task is performed so quickly that every bounding box can be refitted around all the polygons that it contains, in a very short time compared to those methods known with the conventional OOBB and AABB trees. For further optimizing this step, the Streaming SIMD Extensions (SSE) provided by Intel processors can be used.

To evaluate its performance, the effect of the maximum number of polygons allowed in a bounding box and the effect of object's number of polygons, on the detection time, have been analyzed. The tests were done on an Intel Pentium III 930 MHz processor with a Matrox Millennium G450 32 MB graphics card. All reported values are the average of a set of about 2000 collisions with approximately 10–15 colliding polygons. The efficiency of a collision detection method of the present invention has been tested using a model of a scalpel consisting of 128 triangles, and one of the following polygonal models: Face with 1252 triangles, Teapot—3752 triangles, Airways—14436 triangles, Colon—32375 triangles, and the Spinal Column with the Hips—51910 triangles. The last three models were generated from clinical computed tomography (CT) data.

Figure 4A:
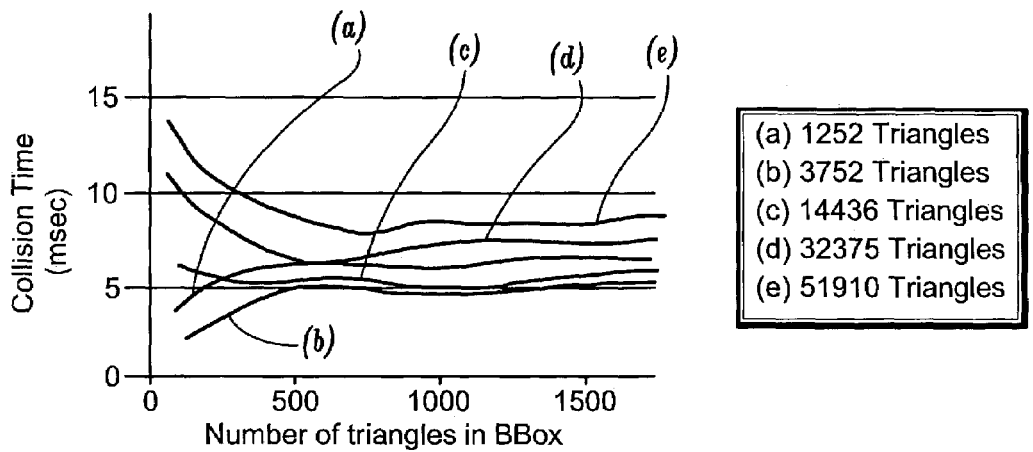
FIGS. 4(a) through 4(c) show the effects of a specific number of polygons per a bounding box on collision detection performance.
Figure 4B:
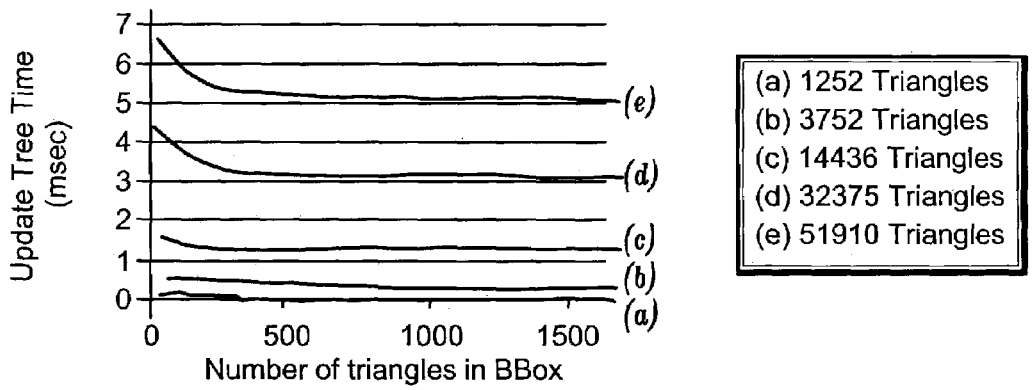
Figure 4C:
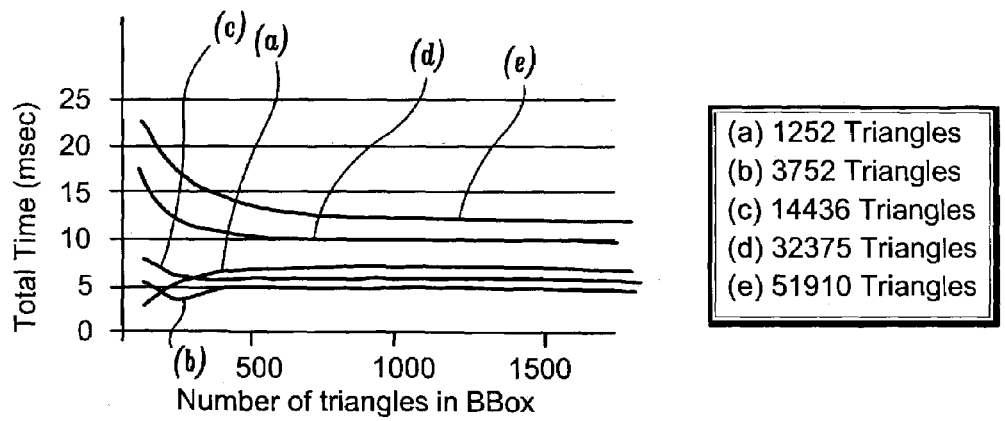

FIGS. 4(a) through 4(c) show the effect of the number of polygons allowed in a bounding box on the performance of our collisions detection method for objects with different number of polygons. FIG. 4(a) shows effect of the number of polygons in a bounding box (BBox) on the performance of the collision detection. FIG. 4(b) shows the update tree time of the AABB tree structure. FIG. 4(c) shows the total iteration time for objects with different number of triangular polygons.

As expected, increasing the number of polygons in a bounding box decreased the speed of the collision detection performance, since it is required to render large number of polygons for every box that has potential collision polygons and to perform many polygon-polygon intersection tests. On the other hand, having a small number of polygons in a bounding box leads to too many boxes for each mesh. Hence, increasing the number of boxes that have to be tested also decreases the efficiency of the detection algorithm.

As shown in FIGS. 4(a) through 4(c), the performance of the collision detection is not very sensitive to the selection of the number of polygons in a bounding box. It is to be noted that about 300–600 polygons in a bounding box have the best performance for large objects (more than 5000 polygons) and 50–150 polygons per bounding box for small objects (less than 5000 polygons). Typically, changing the number of polygons in a bounding box, hence the number of bounding boxes, almost doesn't affect the performance of updating the AABB structure.

Figure 5:
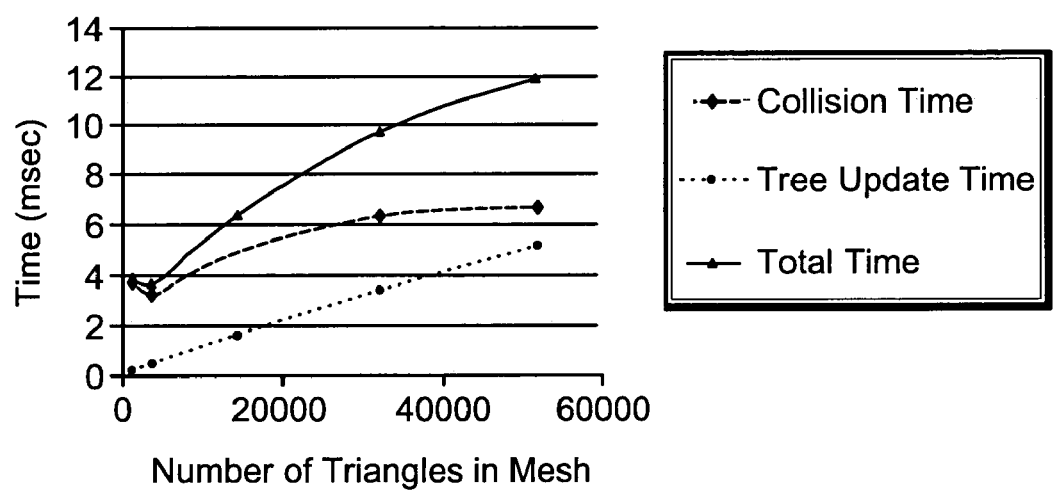
FIG. 5 shows the effect of a total number of polygons to be tested on collision detection performance.

FIG. 5 shows effect of the object's number of polygons on the collision detection performance. As shown in FIG. 5, the collision detection time increases with the total number of polygons. However, the increase rate is far below a linear increase rate. This means that the present collision detection method can handle efficiently deformable models with a large number of polygons without a huge penalty in its performance.

A collision detection method according to an embodiment of the present invention as described, can detect a collision between deformable objects with a large number of polygons, with a relatively small cost in performance when increasing the number of polygons at a high speed. This method is particularly suitable for surgery simulations, where fast interaction is essential.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A collision detection method for a plurality of polygonal deformable objects in a scene, the method comprises:
   building an axis aligned bounding boxes (AABB) tree, including a root and leaves;
   keeping the root of the AABB tree and only leaves that contain a predetermined number of polygons and ignoring all internal nodes of the AABB tree, wherein the predetermined number of polygons is in the range of tens to hundreds of polygons;
   selecting an object among the plurality of polygonal deformable objects as a reference object;
   defining a global bounding box of the reference object with the root of the AABB tree;
   detecting other polygonal deformable objects of the plurality of polygonal deformable objects having bounding boxes that intersect the global bounding box;
   determining intersections for each polygon of the reference object with all polygons of the other of polygonal deformable objects; and
   updating the bounding boxes of the reference object and the bounding boxes of the plurality of polygonal deformable objects.

2. The method claimed in claim 1, the building step further comprising dividing a surface of each object in the scene into a set of axis aligned bounding boxes (AABB).

3. The method claimed in claim 2, further comprising rendering the scene in a selection mode of an OpenGL graphics library specification.

4. The method claimed in claim 3, wherein the step of rendering is performed by using an orthographic camera.

5. The method claimed in claim 2, wherein the step of building the AABB tree comprises separating the axis aligned bounding boxes, thereby each containing a predetermined number of polygons.

6. The method claimed in claim 5, wherein the step of building further comprises determining whether each of the polygons corresponds to a separate bounding box.

7. The method claimed in claim 2, wherein the building step further comprises eliminating bounding boxes that contains no polygons.

8. The method claimed in claim 5, wherein the root and only lower-level leaves of the AABB tree are used for collision detection.

9. The method claimed in claim 3, wherein the step of rendering further comprises naming each object to provide objects in the scene with different names.

10. The method claimed in claim 2, further comprising detecting bounding boxes of the reference object that intersect with detected first bounding boxes of the plurality of polygonal objects.

11. The method claimed in claim 10, further comprising generating a list of polygons of the reference object that have potential collision with an object or objects in the scene.

12. The method claimed in claim 11, further comprising generating a list of polygons of the plurality of polygonal objects that intersect with detected second bounding boxes of the reference object.

13. A collision detection method in a scene having a reference object and a plurality of other polygonal objects, the method comprises:
   building an AABB tree by recursively dividing a surface of each polygonal object in the scene into a set of axis aligned bounding boxes (AABB);
   keeping the root of the AABB tree and only leaves that contain a predetermined number of polygons and ignoring all internal nodes of the AABB tree:
   detecting first bounding boxes of the plurality of other polygonal objects that intersect a global bounding box of a reference object;
   generating a list of polygons of the reference object that have potential collision with an object or objects in the scene and a list of polygons of the plurality of other polygonal objects that intersect with detected second bounding boxes of the reference object;

determining intersections for each polygon of the reference object with all polygons of the plurality of other polygonal objects; and updating bounding boxes of the reference object if it is deformable and bounding boxes of the plurality of other polygonal objects that are deformable.

14. The method claimed in claim 13, further comprising rendering objects in the scene in a selection mode of an OpenGL graphics library specification.

15. The method claimed in claim 14, wherein the step of rendering is performed by using an orthographic camera.

16. The method claimed in claim 13, wherein the step of building the AABB tree comprises separating the axis aligned bounding boxes, thereby each containing a predetermined number of polygons.

17. The method claimed in claim 14, wherein the step of rendering further comprises naming each object to provide the objects in the scene with different names.

18. The method claimed in claim 13, further comprising detecting second bounding boxes of the reference object that intersect with detected first bounding boxes of the plurality of polygonal objects.

19. A program storage device readable by machine, tangibly embodying a program of instructions executable by the machine to perform method steps for detecting collision between a plurality of polygonal objects in a scene using OpenGL graphics library specification, the method steps comprising:

dividing a surface of each object into a set of axis aligned bounding boxes (AABB) to build an AABB tree;

keeping the root of the AABB tree and only leaves that contain a predetermined number of polygons and ignoring all internal nodes of the AABB tree;

selecting an object among the plurality of polygonal objects as a reference object;

defining a global bounding box of the reference object;

detecting first bounding boxes of the plurality of polygonal objects that intersect the global bounding box of the reference object;

determining intersections for each detected polygon of the reference object with all detected polygons of the plurality of polygonal objects; and updating the bounding boxes of the reference object and the bounding boxes of the plurality of polygonal objects, wherein the plurality of polygonal objects are rendered in selection mode of the OpenGL graphics library specification using an orthographic camera.

20. The program storage device claimed in claim 19, wherein the step of dividing comprises separating the axis aligned bounding boxes, thereby each containing a predetermined number of polygons.

21. The program storage device claimed in claim 20, wherein the step of dividing further comprises determining whether each of the polygons corresponds to a separate bounding box.

22. The program storage device claimed in claim 19, further comprising detecting second bounding boxes of the reference object that intersect with detected first bounding boxes of the plurality of polygonal objects.

23. The program storage device claimed in claim 19, further comprising generating a list of polygons of the reference object that have potential collision with an object or objects in the scene.

24. The program storage device claimed in claim 19, further comprising generating a list of polygons of the plurality of polygonal objects that intersect with detected second bounding boxes of the reference object.

* * * * *